(12) United States Patent
Yang

(10) Patent No.: US 7,601,021 B1
(45) Date of Patent: Oct. 13, 2009

(54) CONNECTOR ASSEMBLY

(75) Inventor: Haven Yang, Chung Ho (TW)

(73) Assignee: All Best Electronics Co., Ltd. (TW)

( * ) Notice: Subject to any disclaimer, the term of this patent is extended or adjusted under 35 U.S.C. 154(b) by 0 days.

(21) Appl. No.: 12/405,315

(22) Filed: Mar. 17, 2009

(51) Int. Cl.
*H01R 13/02* (2006.01)

(52) U.S. Cl. ................................... 439/487

(58) Field of Classification Search ............... 439/487; 361/700–728
See application file for complete search history.

(56) References Cited

U.S. PATENT DOCUMENTS

| | | | | |
|---|---|---|---|---|
| 5,876,239 A * | 3/1999 | Morin et al. | ............... | 439/490 |
| 6,558,191 B2 * | 5/2003 | Bright et al. | ............. | 439/541.5 |
| 6,567,360 B1 * | 5/2003 | Kagawa | ..................... | 720/609 |
| 6,957,982 B1 * | 10/2005 | Hyland et al. | .......... | 439/620.05 |
| 7,120,024 B2 * | 10/2006 | Watanabe et al. | ........... | 361/704 |
| 7,249,966 B2 * | 7/2007 | Long | ....................... | 439/541.5 |
| 7,452,216 B2 * | 11/2008 | Murr et al. | .................... | 439/74 |
| 2006/0003628 A1 * | 1/2006 | Long et al. | ............... | 439/541.5 |
| 2008/0019100 A1 * | 1/2008 | Yang | .......................... | 361/716 |

* cited by examiner

*Primary Examiner*—Briggitte R Hammond
(74) *Attorney, Agent, or Firm*—Schmeiser, Olsen & Watts

(57) ABSTRACT

A connector assembly is suitable for use with various types of connector chip modules, and includes a heat sink detachably connected to a top of a cover of the connector assembly via a heat-sink fastening member, so that heat produced by the connector chip module on the connector assembly during the operation thereof can be effectively dissipated into ambient environment via the heat sink. Therefore, the connector assembly can be widely applied to all kinds of connector chips.

8 Claims, 5 Drawing Sheets

A-A

CONNECTOR ASSEMBLY

FIELD OF THE INVENTION

The present invention relates to a connector assembly, and more particularly to a connector assembly provided with a heat sink to enable effective dissipation of heat produced by a connector chip module inserted in the connector assembly.

BACKGROUND OF THE INVENTION

With the coming of the globalization age, people require work efficiency and convenience much higher than ever before. Consumers of nowadays prefer to purchase electronic products that can achieve more functions within the shortest possible time or at the highest possible efficiency. Therefore, to satisfy the consumers' requirements, it is a must to break through the bottleneck in the electronic industrial fields by researching and developing a new generation of products that are compact in volume, provide multiple functions, and work at high efficiency. When viewing from the point of research and development, techniques for the semiconductor process and integrated circuit (IC) design have surprising progress in recently ten years to successfully achieve the purposes of minimizing and integrating various electronic elements, enabling a plurality of electronic products to integrate multiple functions. However, new problems arise with the miniaturized and integrated electronic elements to result in reduced element reliability. That is, when the electronic elements operate, they require electric power to work. However, it is impossible to achieve the 100% efficiency, and some power is wasted and converted into heat energy, which would cause largely risen operating temperature of the whole system. In the event the operating temperature exceeds an allowable limit, errors might occur in the system operation. In worse conditions, the system might become failed or burned out due to overheat. For the new-generation electronic products having high density of electronic elements, the number of the internal electronic elements and the operating speed thereof all are much higher than the conventional electronic products. As a result, the new-generation electronic products produce more heat when they operate, and are therefore more easily subject to high operating temperature that exceeds the allowable limit to form another problem.

It is therefore tried by the inventor to develop an improved connector assembly that can be used with connector chip modules that would produce a large amount of heat, and can therefore be widely applied to various types of connector chips.

SUMMARY OF THE INVENTION

A primary object of the present invention is to overcome the problems in the conventional connectors by providing a connector assembly suitable for use with connector chip modules that will produce a high amount of heat during operation thereof, so that the connector assembly can be widely applied to all kinds of connector chips.

To achieve the above and other objects, the connector assembly according to the present invention includes a lower cover being provided at predetermined positions with a plurality of first through holes, and at two opposite lateral sides with a plurality of first catchers; an upper cover having an overall length longer than that of the lower cover, and including a plurality of outward extended first projections provided on two opposite lateral walls of the upper cover, a plurality of insertion tabs provided along lower edges of the two opposite lateral walls of the upper cover, at least one second catcher located on a top of the upper cover near a front end thereof, and a locating element formed on a rear end wall of the upper cover, so that when the upper cover is closed onto the lower cover, the first projections are engaged with the first catchers to thereby connect the upper cover to the lower cover, and the connected lower and upper covers define a front open end; an elastic-leaf member being partially set in the front open end of the connected lower and upper covers; a front-mounted fastening member for fastening around a front portion of the elastic-leaf member that is forward protruded from the front open end; at least one heat sink; at least one heat-sink fastening member having at least two hold-down tabs separately located at a front and a rear end of the heat-sink fastening member, a bent portion formed at a lower front end of the heat-sink fastening member for engaging with the second catcher, a third catcher formed at a lower rear end of the heat-sink fastening member for engaging with the locating element, and the heat-sink fastening member holding the heat sink to the top of the upper cover; and at least one light guiding member being disposed above the heat-sink fastening member.

With the above arrangements, the connector assembly of the present invention is indeed suitable for use with connector chip modules that would produce a high amount of heat during operation thereof, and can therefore be widely applied to various kinds of connector chips.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
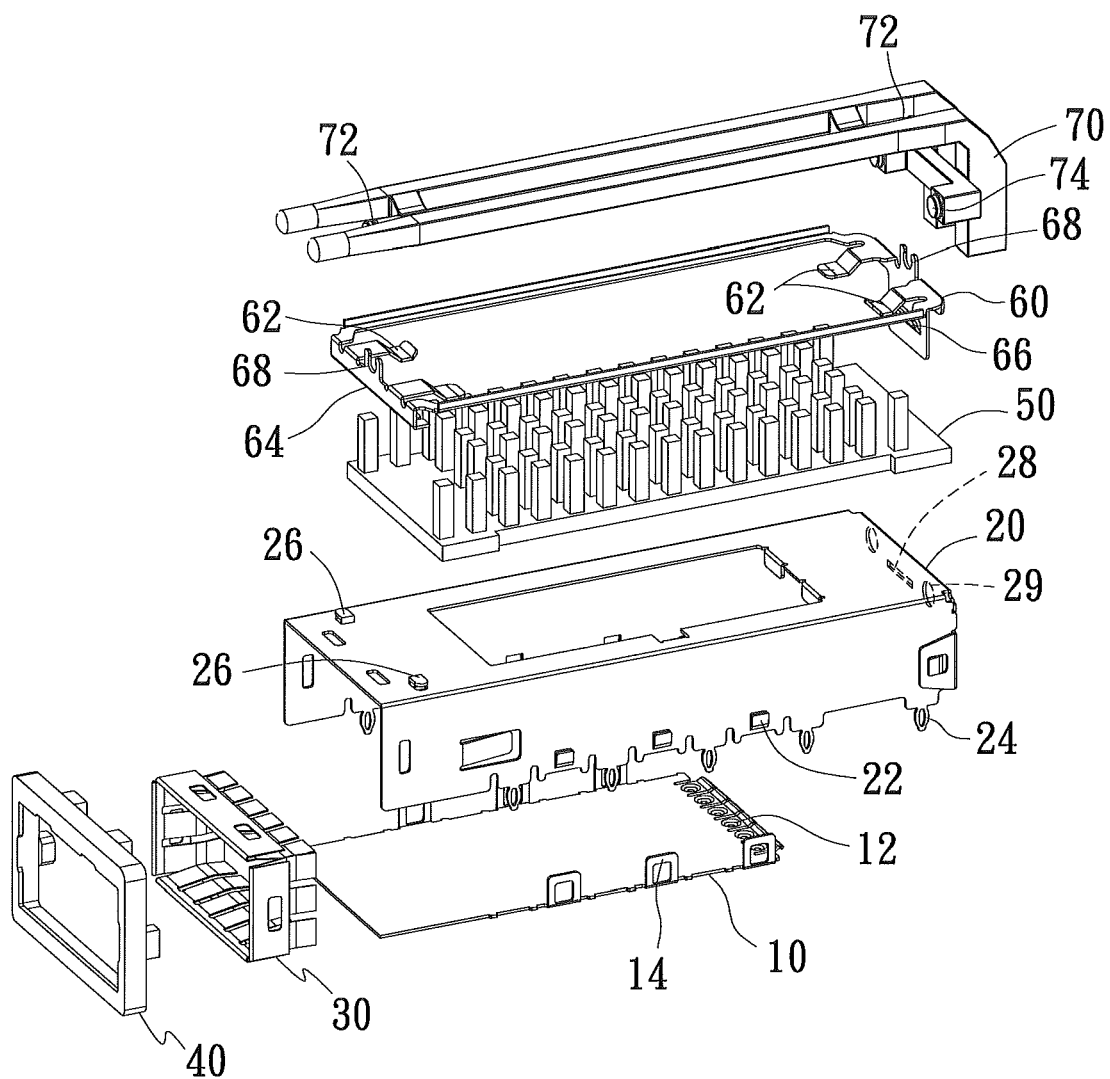
FIG. 1 is an exploded perspective view of a connector assembly according to a first embodiment of the present invention.
Figure 2:
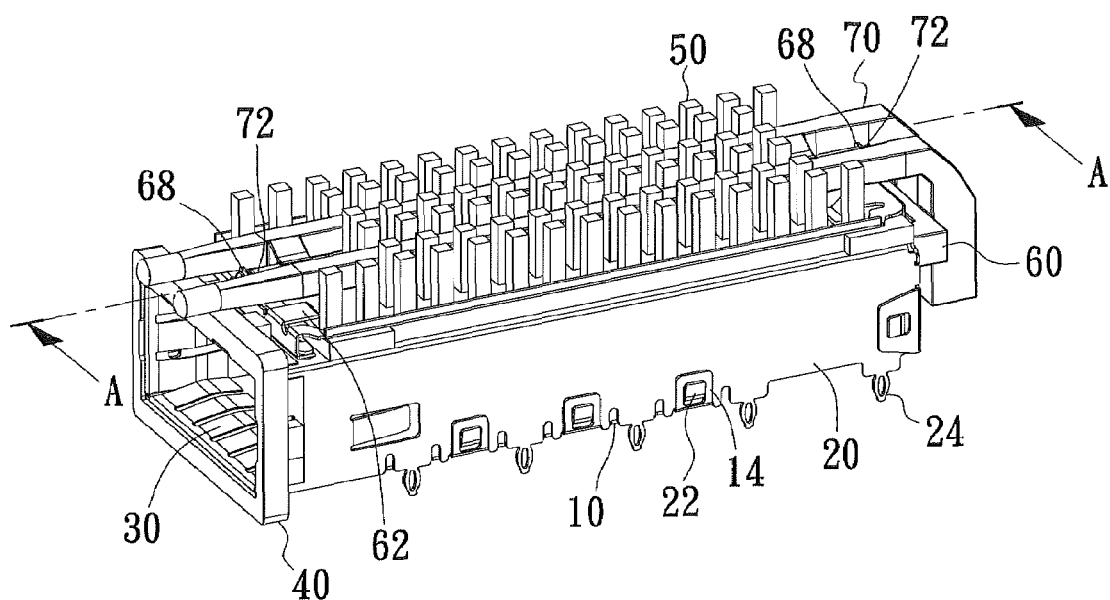
FIG. 2 is an assembled view of FIG. 1.
Figure 3:
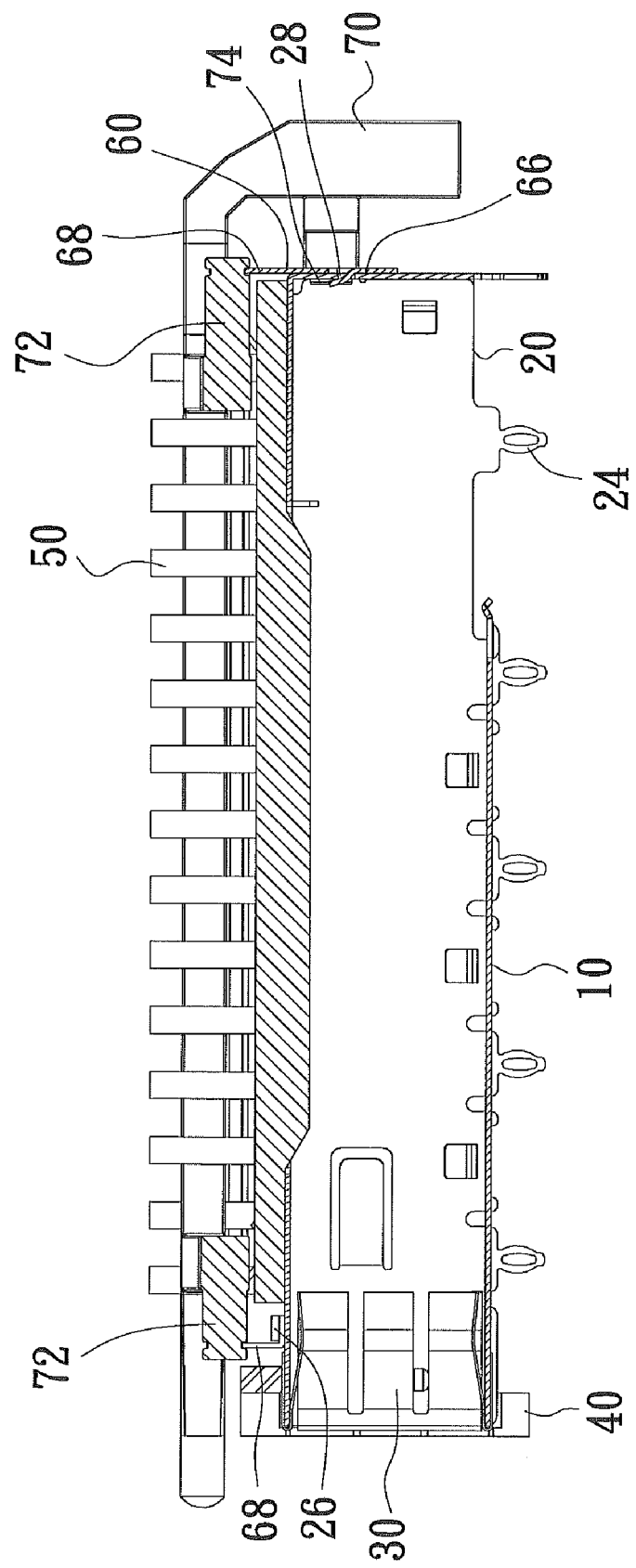
FIG. 3 is a sectional view taken along line A-A of FIG. 2.

Please refer to FIGS. 1 and 2 that are exploded and assembled perspective views, respectively, of a connector assembly according to a first embodiment of the present invention; and to FIG. 3 that is a sectional view taken along line A-A of FIG. 2. As shown, the connector assembly in the first embodiment includes a lower cover 10, an upper cover 20, an elastic-leaf member 30, a front-mounted fastening member 40, a heat sink 50, a heat-sink fastening member 60, and a light guiding member 70.

The lower cover 10 is provided at predetermined positions with a plurality of first through holes 12, and at two opposite lateral sides with a plurality of first catchers 14. The upper cover 20 has an overall length longer than that of the lower cover 10, and includes a plurality of outward extended first projections 22, a plurality of insertion tabs 24, two second catchers 26, and a locating element 28. The first projections 22 are provided on two opposite lateral walls of the upper cover 20, the insertion tabs 24 are provided along lower edges of the two opposite lateral walls of the upper cover 20, the two second catchers 26 are located on a top of the upper cover 20 near a front end thereof, and the locating element 28 is formed on a rear end wall of the upper cover 20. When the upper cover 20 is closed onto the lower cover 10, the first projections 22 are engaged with the first catchers 14 to thereby connect the upper cover 20 to the lower cover 10. And, the connected lower and upper covers 10, 20 define a front open end.

The elastic-leaf member 30 is partially set in the front open end of the connected lower and upper covers 10, 20, and the front-mounted fastening member 40 is fitted around a front portion of the elastic-leaf member 30 that is forward protruded from the front open end. The assembled lower cover 10, upper cover 20, elastic-leaf member 30, and front-mounted fastening member 40 together define an insertion space for connecting terminals.

The heat-sink fastening member 60 has four hold-down tabs 62, a bent portion 64, and a third catcher 66. The four hold-down tabs 62 are divided into two pairs separately located at a front and a rear end of the heat-sink fastening member 60. The bent portion 64 is formed at a lower front end of the heat-sink fastening member 60 for engaging with the two second catchers 26, which are provided on the top of the upper cover 20. The third catcher 66 is formed at a lower rear end of the heat-sink fastening member 60 for engaging with the locating element 28. The heat-sink fastening member 60 holds the heat sink 50 to the top of the upper cover 20. The light guiding member 70 is disposed above the heat-sink fastening member 60 for guiding light beams emitted by a light-emitting-diode (LED) lamp mounted on a circuit board, and the LED lamp can be used to indicate whether a connector chip module on the connector assembly is in a normal state for use or not. And, it is noted the connector chip module will produce a large amount of heat during the operation thereof.

With the heat sink 50 being detachably mounted to the top of the upper cover 20 by the heat-sink fastening member 60, heat produced by the connector chip module can be effectively dissipated via the heat sink 50 into ambient environment to reduce the possibility of a damaged connector chip module due to overheating.

In the connector assembly according to the first embodiment of the present invention, the heat-sink fastening member 60 can be further provided at the front and rear ends with an open-topped recess 68 each. Meanwhile, the light guiding member 70 is further provided with two round posts 72 corresponding to the two recesses 68, so that the light guiding member 70 is disposed on the top of the heat-sink fastening member 60 with the two round posts 72 engaged with the two recesses 68.

In the connector assembly according to the first embodiment of the present invention, the upper cover 20 can be further provided on the rear end wall with a pair of spaced second through holes 29. Meanwhile, the light guiding member 70 is further provided at positions corresponding to the pair of second through holes 29 with two forward projected bosses 74 for extending through and thereby engaging with the pair of second through holes 29.

The engaged recesses 68 and round posts 72 ensure firm and stable connection of the light guiding member 70 to the top of the heat-sink fastening member 60; and the engaged second through holes 29 and bosses 74 ensure firm and stable connection of the light guiding member 70 to the upper cover 20.

Figure 4:
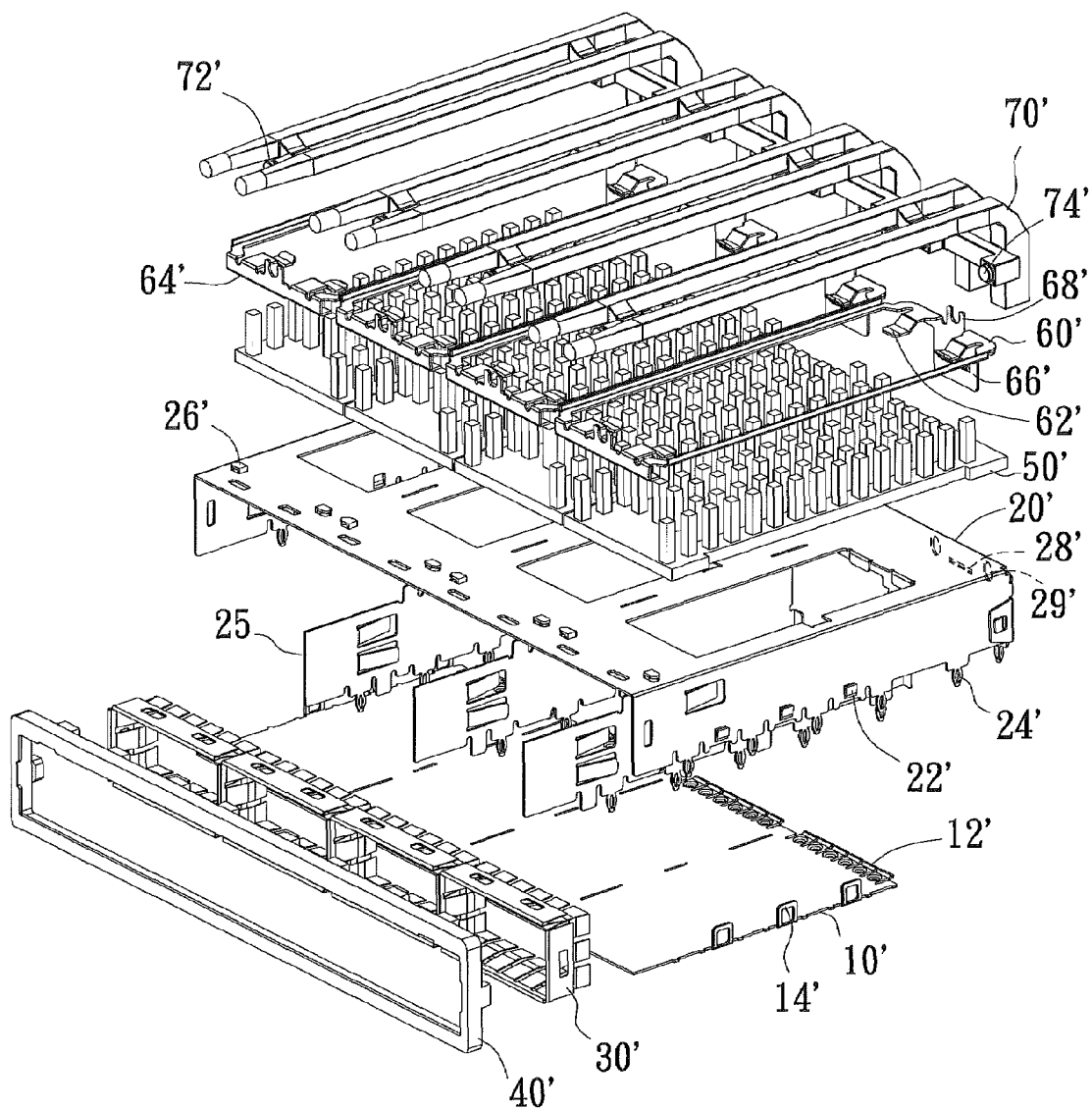
FIG. 4 is an exploded perspective view of a connector assembly according to a second embodiment of the present invention.
Figure 5:
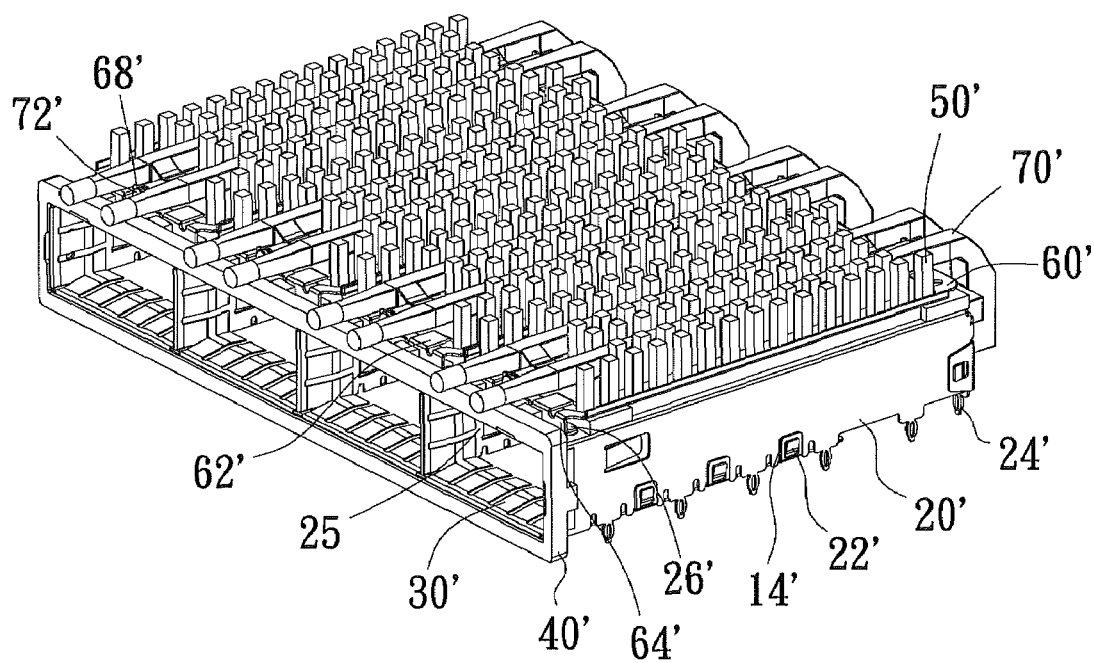
FIG. 5 is an assembled view of FIG. 4.

FIGS. 4 and 5 are exploded and assembled perspective views, respectively, of a connector assembly according to a second embodiment of the present invention. As can be seen from FIGS. 4 and 5, the connector assembly in the second embodiment includes a lower cover 10', an upper cover 20', an elastic-leaf member 30', a front-mounted fastening member 40', a plurality of heat sinks 50', a plurality of heat-sink fastening members 60', a plurality of light guiding members 70', and at least one spacer 25.

The lower cover 10' is provided at predetermined positions with a plurality of first through holes 12', and at two opposite lateral sides with a plurality of first catchers 14'. The upper cover 20' has an overall length longer than that of the lower cover 10', and includes a plurality of outward extended first projections 22', a plurality of insertion tabs 24', a plurality of second catchers 26', and a plurality of locating elements 28'. The first projections 22' are provided on two opposite lateral walls of the upper cover 20', the insertion tabs 24' are provided along lower edges of the two opposite lateral walls of the upper cover 20', the second catchers 26' are located on a top of the upper cover 20' near a front end thereof, and the locating elements 28' are formed on a rear end wall of the upper cover 20'. When the upper cover 20' is closed onto the lower cover 10', the first projections 22' are engaged with the first catchers 14' to thereby connect the upper cover 20' to the lower cover 10'. And, the connected lower and upper covers 10' and 20' define a front open end.

The elastic-leaf member 30' is partially set in the front open end of the connected lower and upper covers 10' and 20', and the front-mounted fastening member 40' is fitted around a front portion of the elastic-leaf member 30' that is forward protruded from the front open end. The spacer 25 is disposed between the lower cover 10' and the upper cover 20' to divide a space defined in the connected lower and upper covers 10' and 20' into a plurality of insertion spaces for connecting terminals. The spacer 25 also functions to guide the connector terminals into the insertion spaces.

The heat-sink fastening members 60' each have four hold-down tabs 62', a bent portion 64', and a third catcher 66'. The four hold-down tabs 62' are divided into two pairs separately located at a front and a rear end of the heat-sink fastening member 60'. The bent portion 64' is formed at a lower front end of the heat-sink fastening member 60' for engaging with two of the second catchers 26' provided on the top of the upper cover 20'. The third catcher 66' is formed at a lower rear end of the heat-sink fastening member 60' for engaging with one of the locating elements 28'. The heat-sink fastening members 60' hold the heat sinks 50 to the top of the upper cover 20'. The light guiding members 70' are separately disposed above the heat-sink fastening members 60' for guiding light beams emitted by LED lamps correspondingly mounted on a circuit board, and the LED lamps each can be used to indicate whether a corresponding connector chip module on the connector assembly is in a normal state or not. And, it is noted the LED lamps will produce a large amount of heat during the operation thereof.

With the heat sinks 50' being detachably mounted to the top of the upper cover 20' by the heat-sink fastening members 60', heat produced by the connector chip modules can be effectively dissipated via the heat sinks 50' into ambient environment to reduce the possibility of damaged connector chip modules due to overheating.

In the connector assembly according to the second embodiment of the present invention, each of the heat-sink fastening members 60' can be further provided at the front and rear ends with an open-topped recess 68' each. Meanwhile, each of the light guiding members 70' is further provided with two round posts 72' corresponding to the two recesses 68', so that each of the light guiding members 70' is disposed on the top of one of the heat-sink fastening members 60' with the two round posts 72' engaged with the two recesses 68'.

In the connector assembly according to the second embodiment of the present invention, the upper cover 20' can be further provided on the rear end wall with a plurality of pairs of spaced second through holes 29'. Meanwhile, the light guiding members 70' each are further provided at positions corresponding to one pair of the second through holes 29' with two forward projected bosses 74' for extending through and thereby engaging with the pair of second through holes 29'.

The engaged recesses 68' and round posts 72' ensure firm and stable connection of the light guiding members 70' to the top of the heat-sink fastening members 60'; and the engaged second through holes 29' and bosses 74' ensure firm and stable connection of the light guiding members 70' to the upper cover 20'.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A connector assembly, comprising:
    a lower cover being provided at predetermined positions with a plurality of first throughholes, and at two opposite lateral sides with a plurality of first catchers;
    an upper cover having an overall length longer than that of the lower cover, and including:
        a plurality of outward extended first projections provided on two opposite lateral walls of the upper cover;
        a plurality of insertion tabs provided along lower edges of the two opposite lateral walls of the upper cover;
        at least one second catcher located on a top of the upper cover near a front end thereof; and
        a locating element formed on a rear end wall of the upper cover;
        whereby when the upper cover is closed onto the lower cover, the first projections are engaged with the first catchers to thereby connect the upper cover to the lower cover, and the connected lower and upper covers define a front open end;
    an elastic-leaf member being partially set in the front open end of the connected lower and upper covers;
    a front-mounted fastening member being fitted around a front portion of the elastic-leaf member that is forward protruded from the front open end;
    at least one heat sink;
    at least one heat-sink fastening member including:
        at least two hold-down tabs separately located at a front and a rear end of the heat-sink fastening member;
        a bent portion formed at a lower front end of the heat-sink fastening member for engaging with the second catcher;
        a third catcher formed at a lower rear end of the heat-sink fastening member for engaging with the locating element; and
        the heat-sink fastening member holding the heat sink to the top of the upper cover; and
    at least one light guiding member being disposed above the heat-sink fastening member.

2. The connector assembly as claimed in claim 1, further comprising at least one spacer being disposed between the lower cover and the upper cover.

3. The connector assembly as claimed in claim 1, wherein the heat-sink fastening member is further provided at the front and rear ends with an open-topped recess each, and the light guiding member is further provided with two round posts corresponding to the two recesses, so that the light guiding member is disposed on the top of the heat-sink fastening member with the two round posts engaged with the two recesses.

4. The connector assembly as claimed in claim 2, wherein the heat-sink fastening member is further provided at the front and rear ends with an open-topped recess each, and the light guiding member is further provided with two round posts corresponding to the two recesses, so that the light guiding member is disposed on the top of the heat-sink fastening member with the two round posts engaged with the two recesses.

5. The connector assembly as claimed in claim 1, wherein the upper cover is further provided on the rear end wall with at least one pair of spaced second through holes; and the at least one light guiding member is further provided at positions corresponding to the at least one pair of second through holes with two forward projected bosses for extending through and thereby engaging with the pair of second through holes.

6. The connector assembly as claimed in claim 2, wherein the upper cover is further provided on the rear end wall with at least one pair of spaced second through holes; and the at least one light guiding member is further provided at positions corresponding to the at least one pair of second through holes with two forward projected bosses for extending through and thereby engaging with the pair of second through holes.

7. The connector assembly as claimed in claim 3, wherein the upper cover is further provided on the rear end wall with at least one pair of spaced second through holes; and the at least one light guiding member is further provided at positions corresponding to the at least one pair of second through holes with two forward projected bosses for extending through and thereby engaging with the pair of second through holes.

8. The connector assembly as claimed in claim 4, wherein the upper cover is further provided on the rear end wall with at least one pair of spaced second through holes; and the at least one light guiding member is further provided at positions corresponding to the at least one pair of second through holes with two forward projected bosses for extending through and thereby engaging with the pair of second through holes.

* * * * *